United States Patent
Bhakta et al.

(10) Patent No.: US 11,214,201 B2
(45) Date of Patent: Jan. 4, 2022

(54) STORAGE BIN FOR A VEHICLE INTERIOR

(71) Applicant: Bayerische Motoren Werke Aktiengesellschaft, Munich (DE)

(72) Inventors: Ankur Bhakta, Sunnyvale, CA (US); Julian Eichhorn, Menlo Park, CA (US); Brian Mok, Santa Clara, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 104 days.

(21) Appl. No.: 16/849,438

(22) Filed: Apr. 15, 2020

(65) Prior Publication Data
US 2021/0323481 A1    Oct. 21, 2021

(51) Int. Cl.
*B60R 7/04*     (2006.01)

(52) U.S. Cl.
CPC ..................... *B60R 7/04* (2013.01)

(58) Field of Classification Search
CPC ....................................................... B60R 7/04
USPC .................................. 296/37.8, 37.1, 24.34
See application file for complete search history.

(56) References Cited

U.S. PATENT DOCUMENTS

| | | | | |
|---|---|---|---|---|
| 2,956,687 A | * | 10/1960 | Robichaud | B65D 81/1075 211/74 |
| 2,973,601 A | * | 3/1961 | Mcknight | A47K 5/02 206/77.1 |
| 6,843,458 B1 | * | 1/2005 | Robinson | A47G 23/0216 248/311.2 |
| 7,686,356 B2 | * | 3/2010 | Wilder | E05B 15/022 292/340 |
| 9,358,930 B1 | * | 6/2016 | Sic | B60R 7/06 |
| 10,213,913 B2 | * | 2/2019 | Pang | B25H 3/06 |

FOREIGN PATENT DOCUMENTS

DE        102019116419 A1 * 12/2020 ............... B60R 7/04

* cited by examiner

*Primary Examiner* — D Glenn Dayoan
*Assistant Examiner* — E Turner Hicks
(74) *Attorney, Agent, or Firm* — Crowell & Moring LLP

(57) ABSTRACT

A storage bin for a vehicle interior having an adaptable object fixation device includes a guiding plate and a plurality of pins defining a pin matrix, wherein each pin is provided with a guide section and wherein the guiding plate is provided with a plurality of through holes, each of which defines a guide hole for receiving the guide section of an associated pin. The pins are individually movably mounted to the guiding plate. Each of the pins is provided with a magnetic end portion at the lower end of the guide section. The guiding plate is made of or includes a ferrous material. The adaptable object fixation device further includes a base plate made of or including a ferrous material. A non-ferrous reset plate is movably arranged between the guiding plate and the base plate below the magnetic end portions of the pins.

15 Claims, 9 Drawing Sheets

Fig. 2
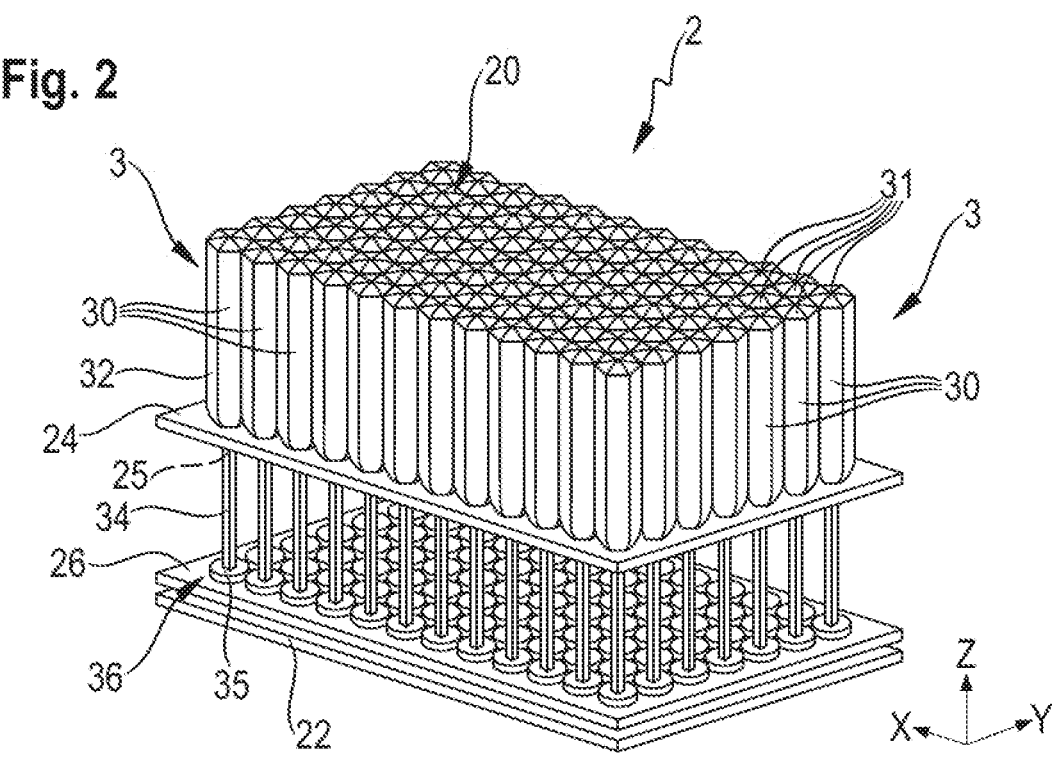
Fig. 2A
Fig. 3
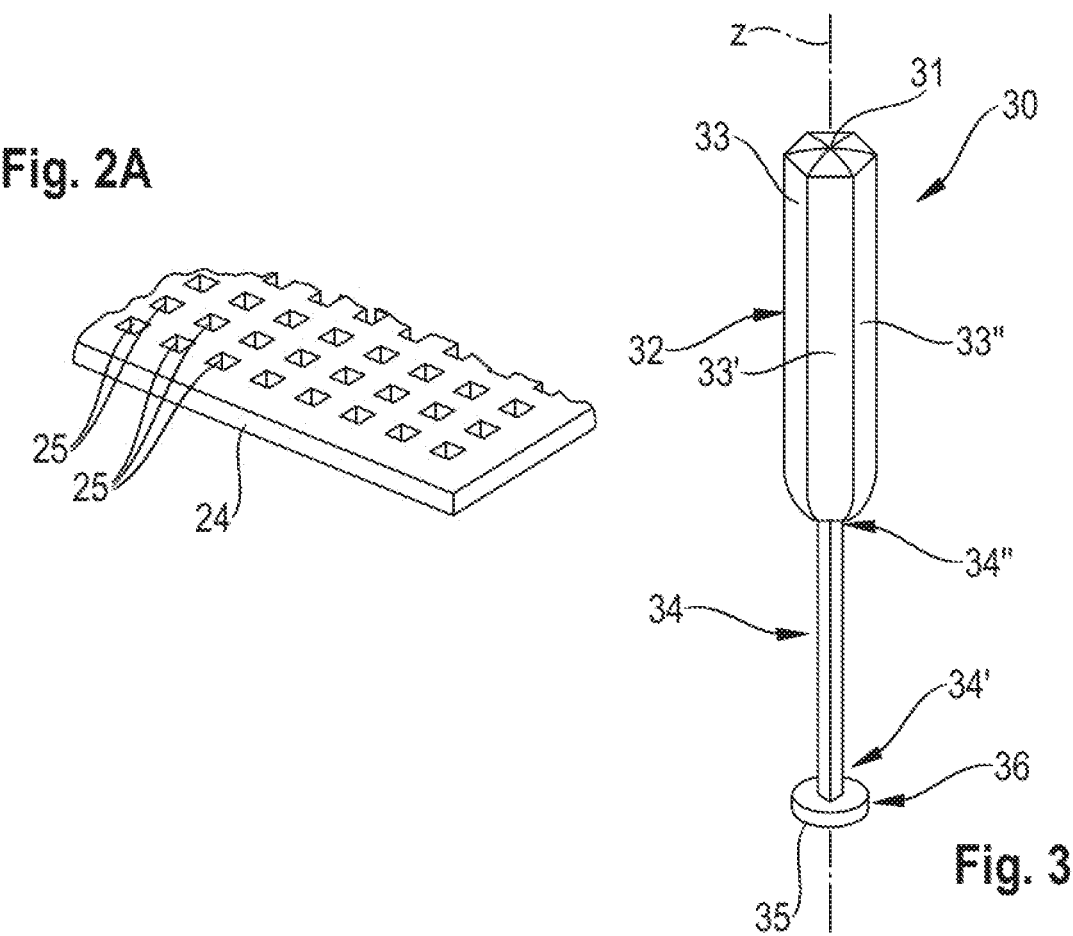

STORAGE BIN FOR A VEHICLE INTERIOR

TECHNICAL FIELD OF THE INVENTION

The present invention relates to a storage bin for a vehicle interior having an adaptable object fixation device comprising a guiding plate and a plurality of pins defining a pin matrix wherein each pin is provided with a guide section and wherein the guiding plate is provided with a plurality of through holes each of which define a guide hole for receiving the guide section of an associated pin, wherein the pins are individually movably mounted to the guiding plate. The invention is further directed to an automotive vehicle comprising at least one such storage bin.

BACKGROUND OF THE INVENTION

Storages in cars, like gloveboxes, middle console trays, door pockets, cupholders and trunks are usually not very adaptive to the many different kinds of objects (e.g. smartphones, luggage, computers, books, toys, cups, glasses, keys etc.) they have to store and fixate while driving. They are pre-compartmented by design and engineering and do not offer a flexible adaptation very well.

DESCRIPTION OF THE PRIOR ART

U.S. Pat. No. 6,843,458 B1 shows and describes a cup holder device with a cylindrical container which contains a clustered arrangement of multiple abutting spring-containing two-piece pins. These pins are vertically grouped within the cylindrical container and are stabilized by two horizontal apertured plates for accepting and holding any size cup which depresses the affected pins. Due to the integrated spring, each pin will return to the extended position after the cup is removed.

U.S. Pat. No. 9,358,930 B1 discloses a storage bin for a vehicle interior with a guiding plate and a plurality of spring-biased pins defining a pin matrix wherein each pin is provided with a guide section around which a coil spring is arranged. The guiding plate is provided with a plurality of through holes each of which defines a guide hole for receiving an associated pin of the plurality of pins, wherein the pins are individually movably mounted to the guiding plate and wherein the associated coil spring is biasing an associated pin in an extended position thereof.

SUMMARY OF THE INVENTION

It is an object of the present invention to provide an improved storage bin for a vehicle interior having an adaptable object fixation device which can be sustainably adapted to a desired contour.

An inventive storage bin for a vehicle interior having an adaptable object fixation device comprises a guiding plate and a plurality of pins defining a pin matrix wherein each pin is provided with a guide section and wherein the guiding plate is provided with a plurality of through holes each of which defines a guide hole for receiving the guide section of an associated pin of the plurality of pins. The pins are individually axially movably mounted to the guiding plate. Each of the pins is provided with a magnetic end portion at the lower end of the guide section. The guiding plate is made of or comprises a ferrous material. The adaptable object fixation device further comprises a base plate made of or comprising a ferrous material. A non-ferrous reset plate is movably arranged between the guiding plate and the base plate below the magnetic end portions of the pins.

The pin matrix of the adaptable object fixation device of the present storage bin defines an upper storage surface, consisting of the upper end surfaces of the plurality of pins. The pins are held in their upper position by the respective magnetic end portion against the ferrous guiding plate. Pressing a pin or a plurality of pins downwards disengages the contact of the magnetic end portion from the magnetic hold with the ferrous guiding plate and the respective pin(s) will move downward until the respective magnetic end portion abuts to the non-ferrous reset plate where it is held by the magnetic force established between the magnetic end portion and the ferrous base plate. The pins of the adaptable object fixation device according to the invention are thus bi-stable and lock in an upper position or a lower position. Putting them together in the pin matrix, in particular in a high-resolution pin matrix, allows to form a support surface that can have indents or boxes that are individually shaped for the object they have to fixate.

Further preferred and advantageous features of the storage bin according to the invention are claimed herein.

Preferably, each through hole of the plurality of through holes has a rotation-protection shape and the guide section of an associated pin of the plurality of pins has a cross-section adapted to the through hole. This design awards the pins a rotation-protection characteristic when they are inserted in their associated guide holes defined by the through holes of the guiding plate.

In an advantageous further development, the respective through hole has a non-circular opening cross-section and the associated guide section has a non-circular cross-section adapted to the shape of the opening cross-section. These non-circular cross-sections are e.g. of polygonal shape, in particular of square shape.

In a preferred embodiment of the invention each pin of the plurality of pins is movable in a first direction being an axial direction of the pin wherein the axial directions of the plurality of pins are aligned in a parallel manner.

Preferably the non-ferrous reset plate is movable in the first direction.

In another preferred embodiment which can be combined with other embodiments of the invention each pin of the plurality of pins comprises an upper support section above the upper end portion of the guide section remote from the magnetic end portion.

It is advantageous to provide the cross-section of the upper support section as being larger than the cross-section of the guide section.

Preferably the cross-section of the upper support section is of hexagonal shape. Nevertheless, the invention is not limited thereto as the cross-section of the upper support section can also be of circular, triangular, rectangular or any other desired shape.

It is advantageous to design the pins so that outer surfaces of adjacent pins of the pin matrix facing each other define plain bearing surfaces so that the pin matrix defines a substantially gap free storage surface. Preferably, these plain bearing surfaces are provided at the circumference of the upper support section of each pin. The pins or their upper support sections, e.g. of hexagonal, triangular or rectangular cross-sectional shape, of the pin matrix are nearly in touch with each other defining inbetween only a thin slit-like bearing gap into which no foreign objects can enter.

In a further preferred embodiment which can be combined with other embodiments of the invention the upper end face of the support section of each pin remote from the guide section is of convex dome shape to avoid that objects placed on the matrix slide get caught by the upper pin edges.

In another further preferred embodiment which can be combined with other embodiments of the invention the lower end portion of the support section of each pin adjacent to the guide section is provided with a rounded circumferential edge and/or is narrowing towards the guide section. This allows a quick and easy assembly of the adaptable object fixation device.

Still a further preferred embodiment which can be combined with other embodiments of the invention is directed to the feature that a section of the object fixation device is designed as a movable inductive charging element of an electric charger device. Such an object fixation device allows to inductively charge an object like a mobile phone while it is placed on the pin matrix comprising the inductive charging element surrounded by the pins.

Preferably the charging element comprises an inductive head section mounted to an upper end of at least one stem defining a guide section of the charging element, the stem being equipped at the lower end thereof with a magnetic end portion, wherein the stem is guided by an associated through hole of the guiding plate. This kind of object fixation device allows to place an electrically inductively chargeable object like a mobile phone on the pin matrix comprising the inductive charging element surrounded by the pins and to fixate it by moving the pins and the charging element downwards until the magnetic end portions of the pins and of the charging element are attracted to the base plate.

In an advantageous further development the stem has a non-circular cross-section and the associated through hole has a non-circular opening cross-section adapted to the shape of the stem cross-section. This design establishes a rotation prevention feature for the charging element.

Finally, the invention is also directed to an automotive vehicle comprising at least one storage bin designed according to the invention.

Preferred embodiments and features of the present invention will be apparent from the following description taken in conjunction with the accompanying drawings in which like reference symbols and numerals designate the same or similar parts.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a perspective view of a part of a pin matrix of an adaptable fixation device according to the invention with depressed pins;

FIG. 2A is a perspective view of a part of a guiding plate;

FIG. 3 is a perspective view of a single pin of a pin matrix;

DETAILED DESCRIPTION OF THE DRAWINGS

Figure 1:
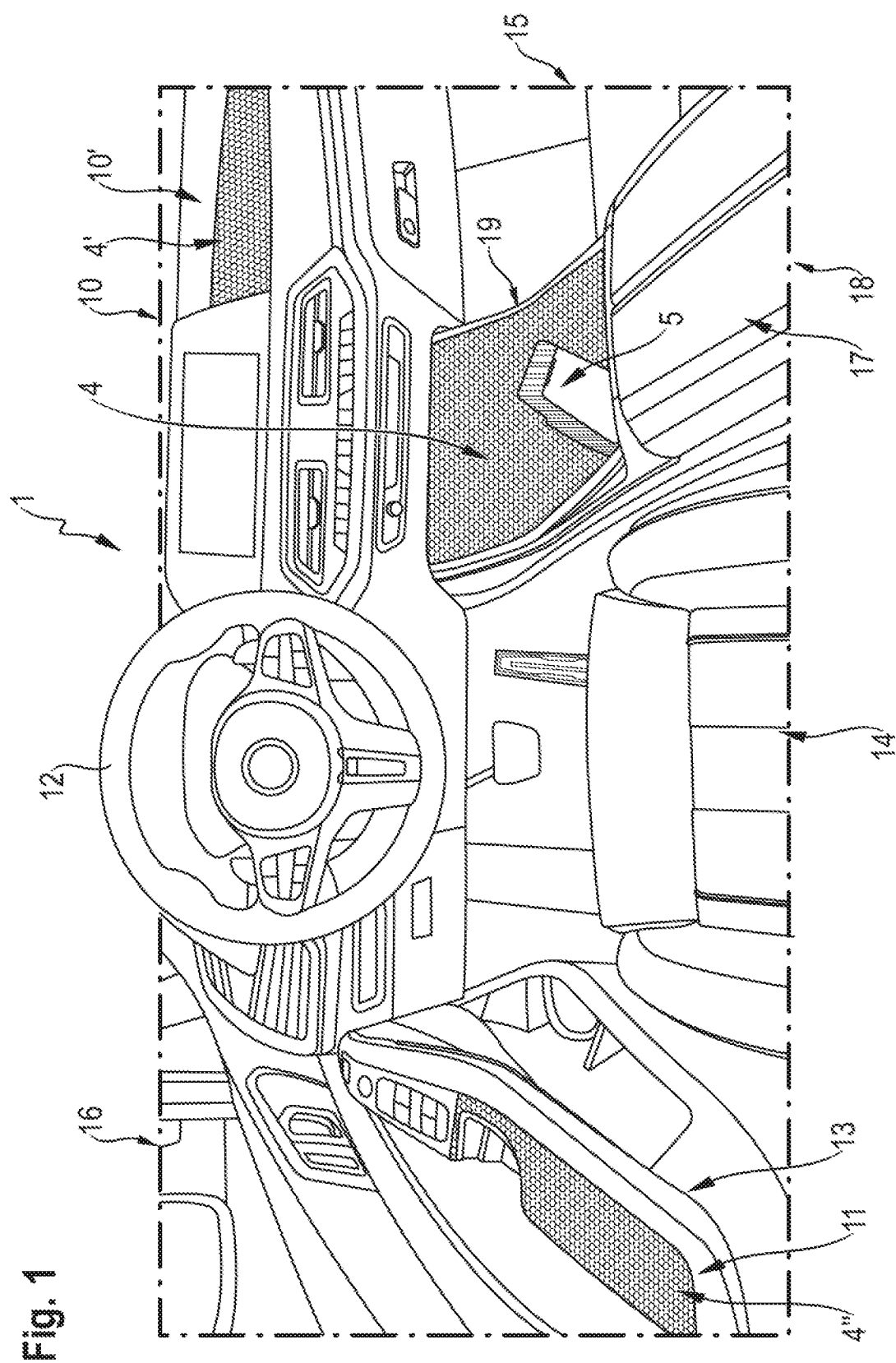
FIG. 1 is a perspective view of a vehicle interior with a middle console and a dashboard.

FIG. 1 shows the interior of an automotive vehicle 1 with a dashboard 10, a steering wheel 12, a driver seat 14 and a passenger seat 15, a vehicle door 16 and a middle console 18. The middle console 18 is provided with an armrest 17 arranged between the driver seat and the passenger seat 15. A center storage area 19 is provided between the armrest 17 and the dashboard 10.

The door 16 has a door armrest 13 which is also provided with a door storage area 11 on its upper surface. A front storage area 10' is provided on the upper side of dashboard 10 in front of the passenger seat 15.

All storage areas 10', 11 and 19 are designed as storage bins 4, 4', 4" having an adaptable object fixation device 2 as described hereinafter. It can be seen that an object 5 is placed and fixated in storage bin 4.

FIG. 2 shows a part of an adaptable object fixation device 2 defining a pin matrix 3. The pin matrix 3 consists of a plurality of two-dimensionally arranged pins 30 which together form by their upper end surfaces 31 a substantially gap-free storage surface 20. FIG. 2 shows all pins 30 in a depressed position which will be described with reference to FIG. 6 with downwardly moved pins 30.

Each pin 30 (FIG. 3) is provided with an upper support section 32, a lower guide section 34 and a magnetic end portion 36 at the lower end 34' of the guide section 34. The magnetic end portion 36 is formed as a flat magnetic disc 35 which defines the lower end of each pin 30 and which extends in a plane that is rectangular to the longitudinal axis z of pin 30.

The upper support section 32 is of hexagonal cross-section in the example shown in FIG. 3 so that the outer surfaces of the upper support section 32 defines six side faces 33, 33', 33" (the remaining three side faces are not shown) each side face 33, 33', 33" extends in a plane which is parallel to the axial direction z of pin 30. Each of these side faces 33, 33', 33" forms a plain bearing surface acting together with a facing side surface of an adjacent pin as a sliding contact bearing for mutual relative movement along the respective longitudinal axis Z.

The cross section of the upper support section 32 (in a plane perpendicular to the axial direction z) is larger than the respective cross section of the guide section 34 as can be seen in FIG. 3. In the shown embodiment the cross section of the guide section 34 is of square shape. However, the cross section of the guide section 34 can be of any other non-circular shape, e.g. a different polygonal shape or an oval shape.

The upper end surface 31 of each support section 32 is of convex dome shape. The lower end portion 32' of the support section 32 of each pin 30 adjacent to the guide section 34 is provided with a rounded circumferential edge 32" and is narrowing towards the guide section 34, i.e. the cross-section of the lower end portion 32' is getting smaller from the support section 32 to the guide section 34.

As can be seen in FIG. 2 the adaptable object fixation device 2 comprises a base plate 22 which consists of a ferrous material or comprises a ferrous material so that it can magnetically interact with the magnetic end portion 36 of each pin 30. The adaptable object fixation device 2 further comprises a guiding plate 24 which is also made of a ferrous material or which comprises a ferrous material so that also the guiding plate 24 is able to magnetically interact with the magnetic end portion 36 of each pin 30. The guiding plate 24 is provided with a plurality of through holes 25 each of which is adapted to receive the guide section 34 of an associated pin 30. Thus, the cross-section of each of the trough holes 25 is of the same non-circular shape as the guide sections 34 of the associated pins 30 are. Such a design avoids a rotational movement of the pins 30 about their longitudinal axis z when they are mounted to the guide plate 24. The through holes 25 are also provided in a two-dimensional matrix in the guiding plate 24 as can be seen from FIG. 2A. Each pin 30 passes with its guide section 34 through one of the through holes 25 in a manner that the upper support section 32 of each pin 30 lies above the guiding plate 24 and that the magnetic end portion 36 lies below the guiding plate 24 as can be seen in FIG. 2.

A non-ferrous reset plate 26 is provided above the base plate 22 between the base plate 22 and the magnetic end portions 36 of the plurality of pins 30.

The operating principle of the storage bin 4, 4', 4" with the adaptable object fixation device 2 is described hereinafter with respect to FIGS. 4 to 7.

Figure 4:
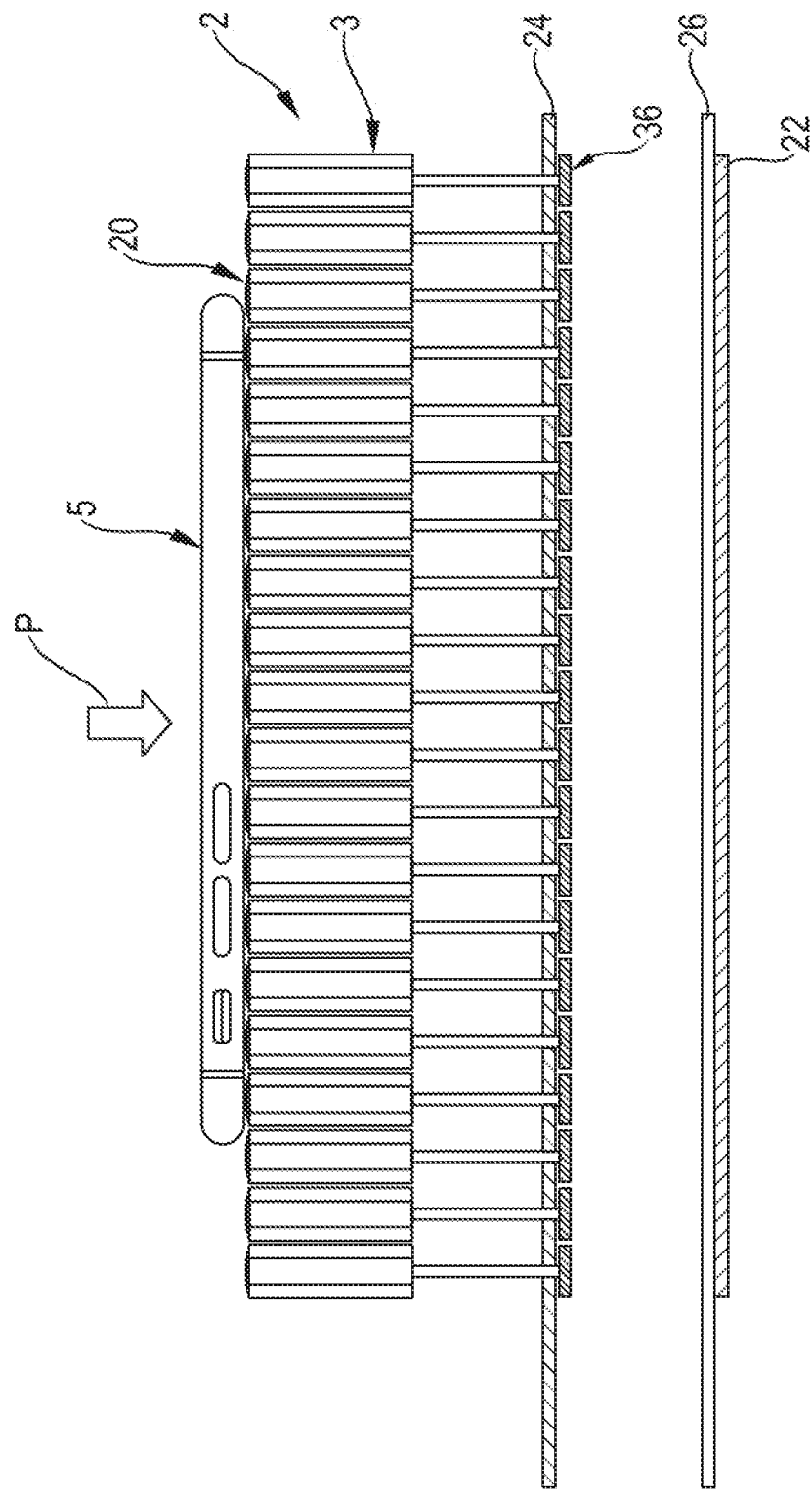
FIG. 4 is a side view of a pin matrix with an object positioned thereon.
Figure 5:
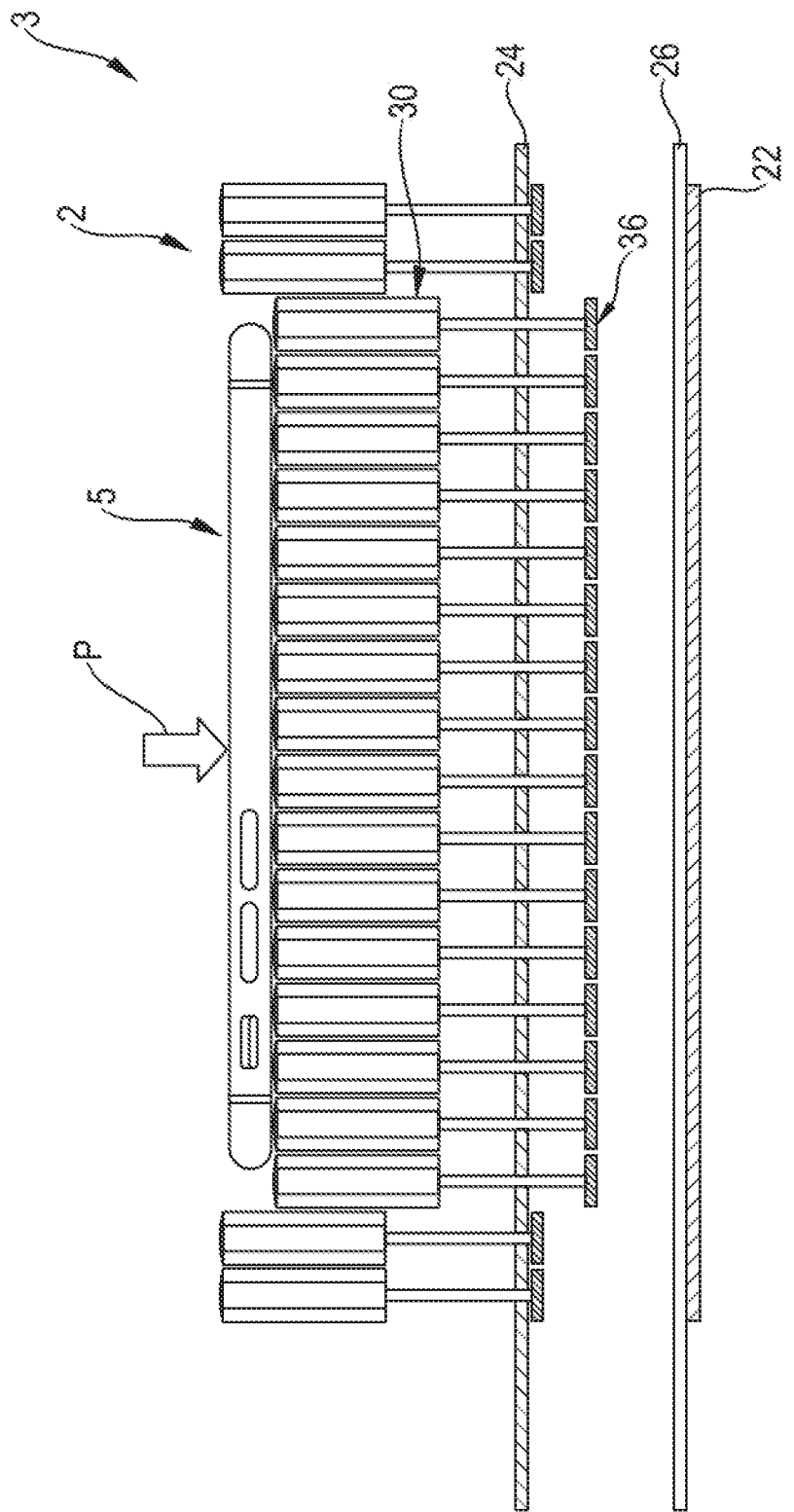
FIG. 5 shows the view of FIG. 4 with the object being pushed down.

FIG. 4 shows a partially cut side view of an adaptable object fixation device 2 as described with respect to FIG. 2.

An object 5 (a smartphone) is placed on the storage surface 20 of the object fixation device 2 and is manually pressed down in the direction of force arrow P. Due to the pressing force P the pins 30 below the object 5 are moved downwards so that the magnetic end portions 36 of each of the downwardly actuated pins 30 disengage from the magnetic attraction to the ferrous guiding plate 24 (FIG. 5) until the magnetic end portions 36 of these pins 30 come into contact with the non-ferrous reset plate 26 where they are held by the magnetic force established between each magnetic end portion 36 and the base plate 22 below the non-ferrous reset plate 26. It can be seen in FIG. 6 that the remaining pins 30' which have not been pressed down form a bordering frame around the object 5.

Figure 7:
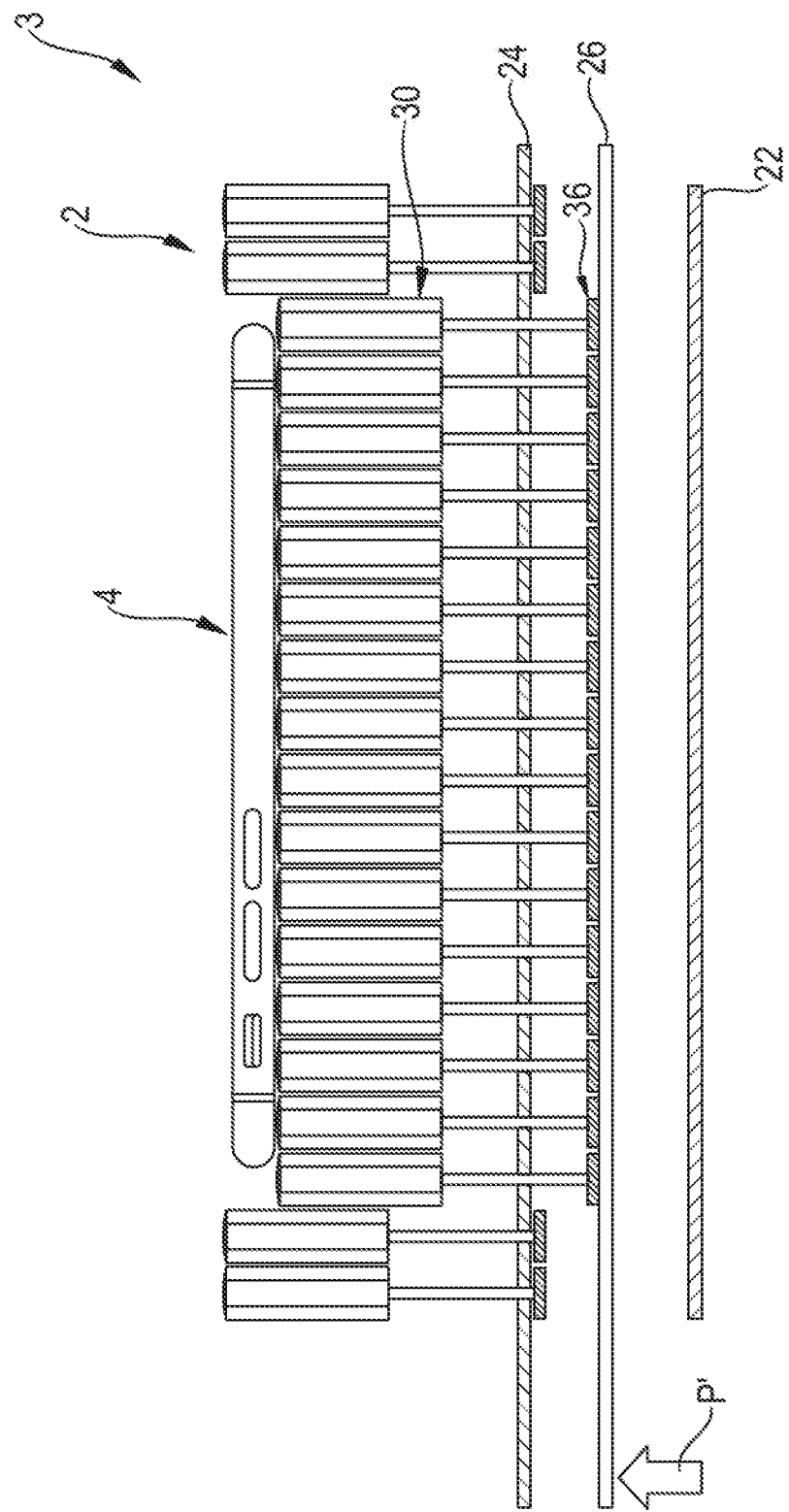
FIG. 7 shows the view of FIG. 4 with the object being released from the storage position.

When the object 5 shall be removed from the adaptable object fixation device 2 of the storage bin 4, 4', 4" the non-ferrous reset plate 26 is lifted upwards as it is symbolized by force arrow P' in FIG. 7. This upwards movement can be manually actuated or can be actuated by a mechanical and/or electrical drive mechanism (not shown). The upwards movement of the non-ferrous reset plate 26 lifts the pins 30 which are charged with the load of the object 5 until their magnetic end portions 36 come into contact with the upper guiding plate 24 to which they are magnetically attracted. Finally, the guiding pins 30 of the adaptable object fixation device 2 take again the condition shown in FIG. 4.

Figure 8:
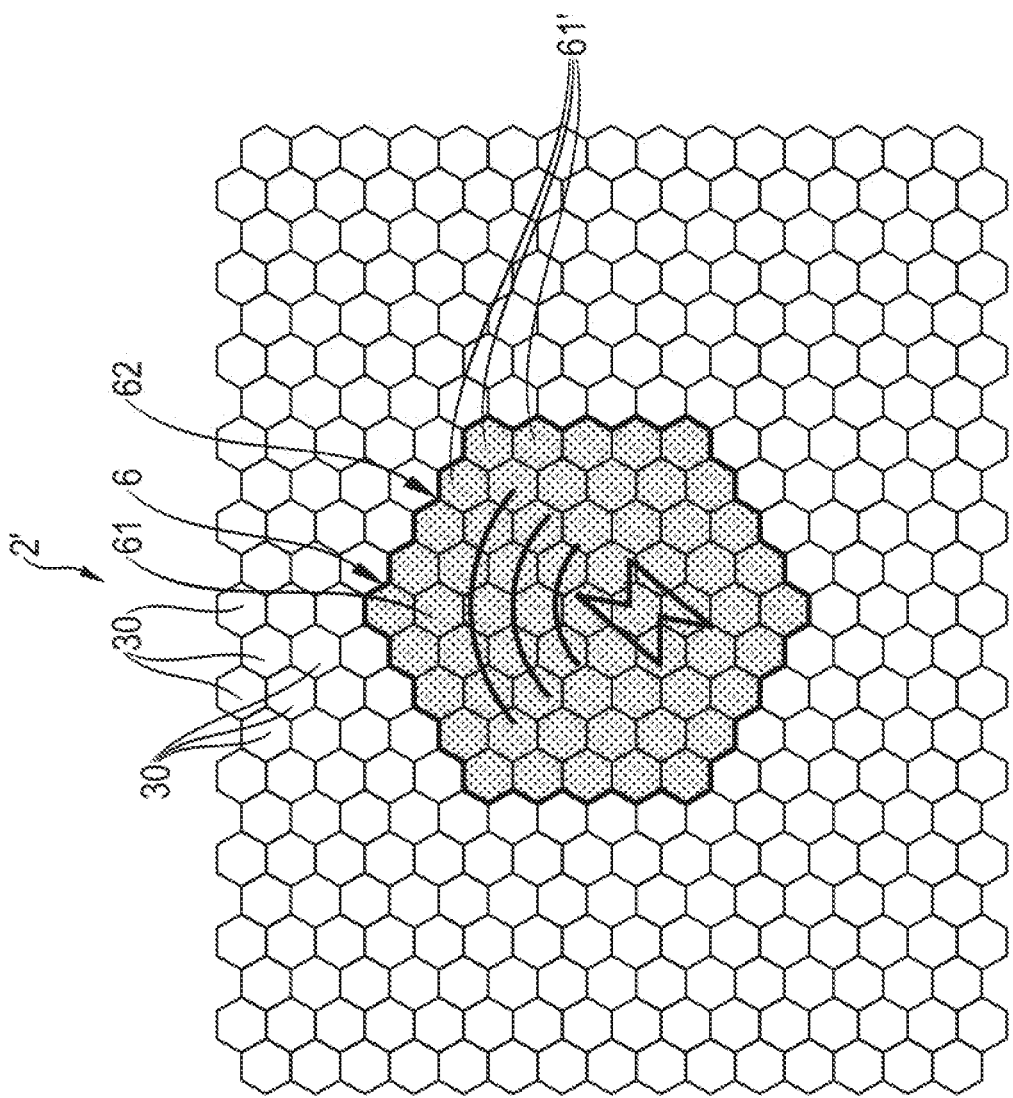
FIG. 8 shows a top view of a second embodiment of the invention with an inductive charging element.

FIG. 8 is a top view of a second embodiment of the invention with an object fixation device 2' and an integrated charger device 6. The electric charger device 6 is provided with a movable inductive charging element 60 having an upper inductive head section 62 and a lower stem as will be explained later with reference to FIG. 9. The object fixation device 2' of FIG. 8 is provided with a plurality of pins 30 of a pin matrix 3' as it has been described with reference to FIGS. 1 to 7. The upper inductive head section 62 of the inductive charging element 60 is provided within the pin matrix 3'. The inductive charging element 60 is of hexagonal cross-section and is surrounded by the plurality of pins 30. The circumference of the head section 62 is defined by zigzag edge lines so that the head section 62 of the charging element 60 is seamlessly surrounded by the hexagonal pins 30 as can be seen in FIG. 8. The upper surface 61 of the inductive head section 62 has a plurality of convex hexagonal knobs 61' each of which having the size and orientation of an upper end surface 31 of a pin 30. This design results in an even knobbed upper surface of the whole object fixation device 2' where there is nearly no visible structural difference between the upper surface of the pin matrix and the upper surface of the charging element 60.

Figure 9:
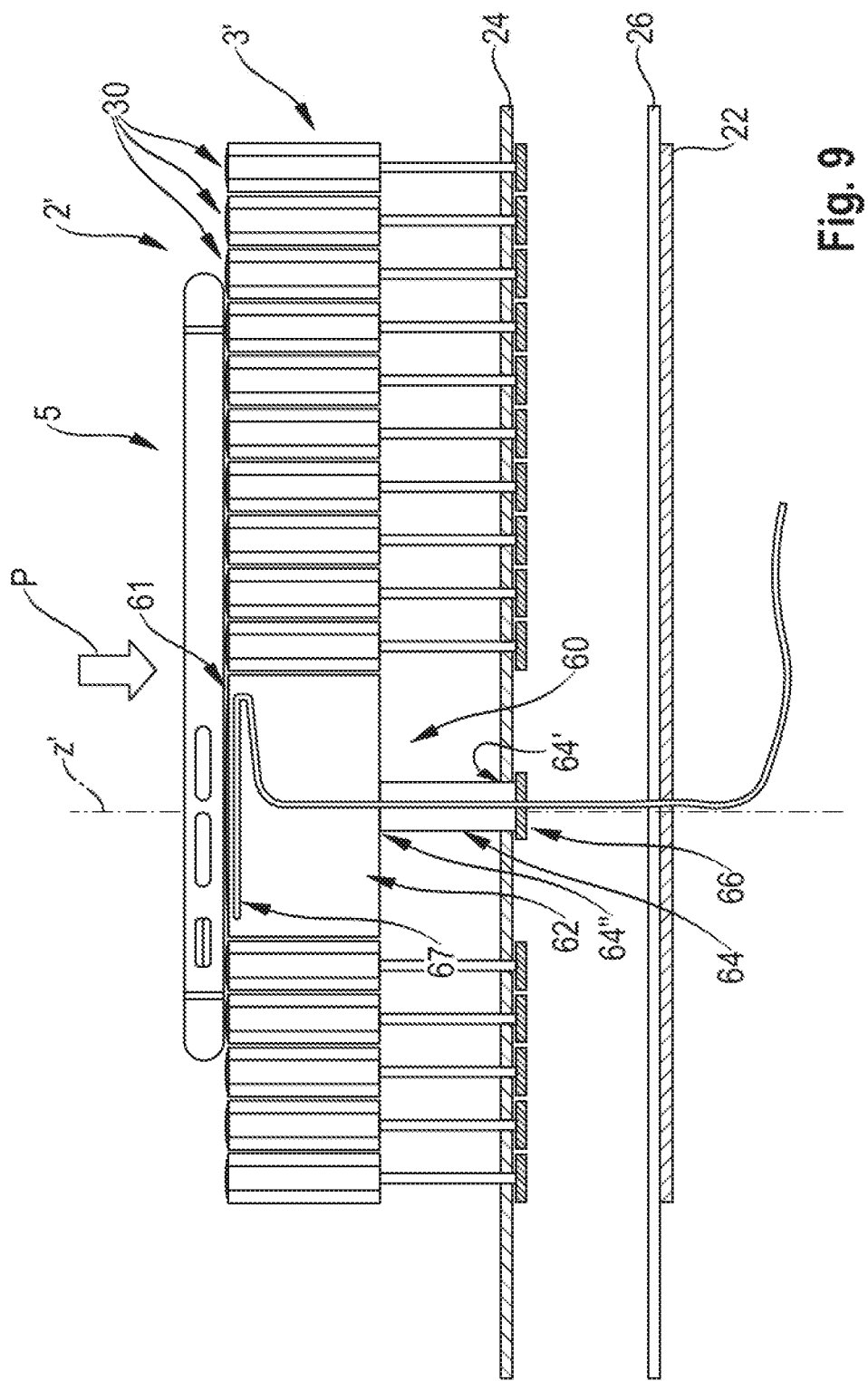
FIG. 9 is a side view of the pin matrix of the embodiment of FIG. 8 with an object positioned thereon, comparing to the view of FIG. 4

As can be seen in FIG. 9 which resembles to FIG. 4 also the charging element 60 is vertically movable like each of the pins 30 is. The inductive head section 62 of the charging element 60 is mounted to an upper end 64" of stem 64 which defines a guide section of the charging element 60. The stem 64 is provided at the lower end 64' thereof with a magnetic end portion 66 which resembles the magnetic end portions 36 of each pin 30. Stem 64 is guided by an associated through hole 25' in guiding plate 24 wherein the stem 64 and the associated through hole 25' have both a non-circular cross section so that stem 64 is prevented from being rotated around his longitudinal axis z' when inserted into the associated through hole 25'. An inductive coil 67 is provided in the upper portion of the inductive head section 62 just under the upper surface 61 of the inductive head section 62.

Figure 6:
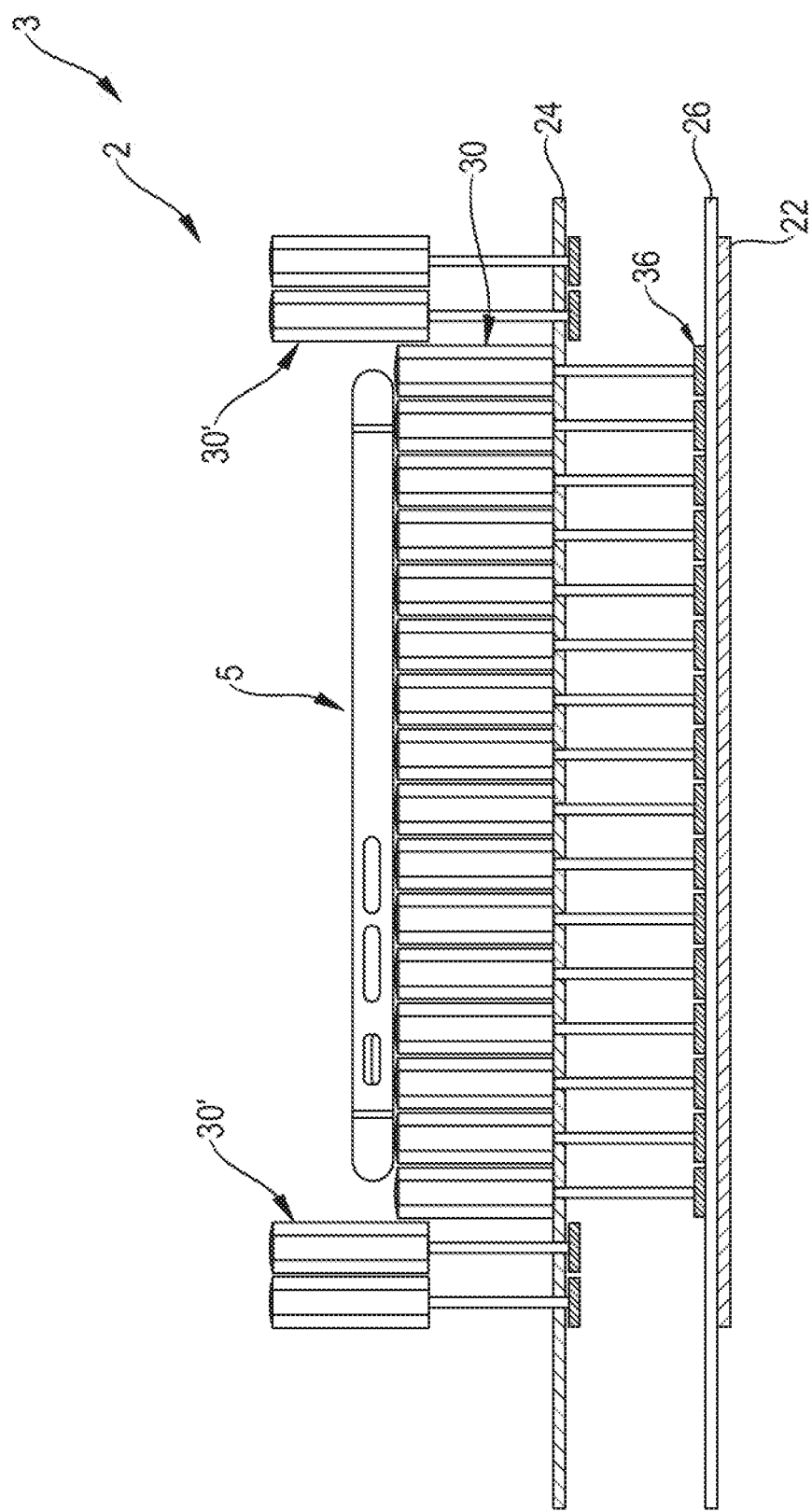
FIG. 6 shows the view of FIG. 4 with the object being fixated in a storage position.
Figure 10:
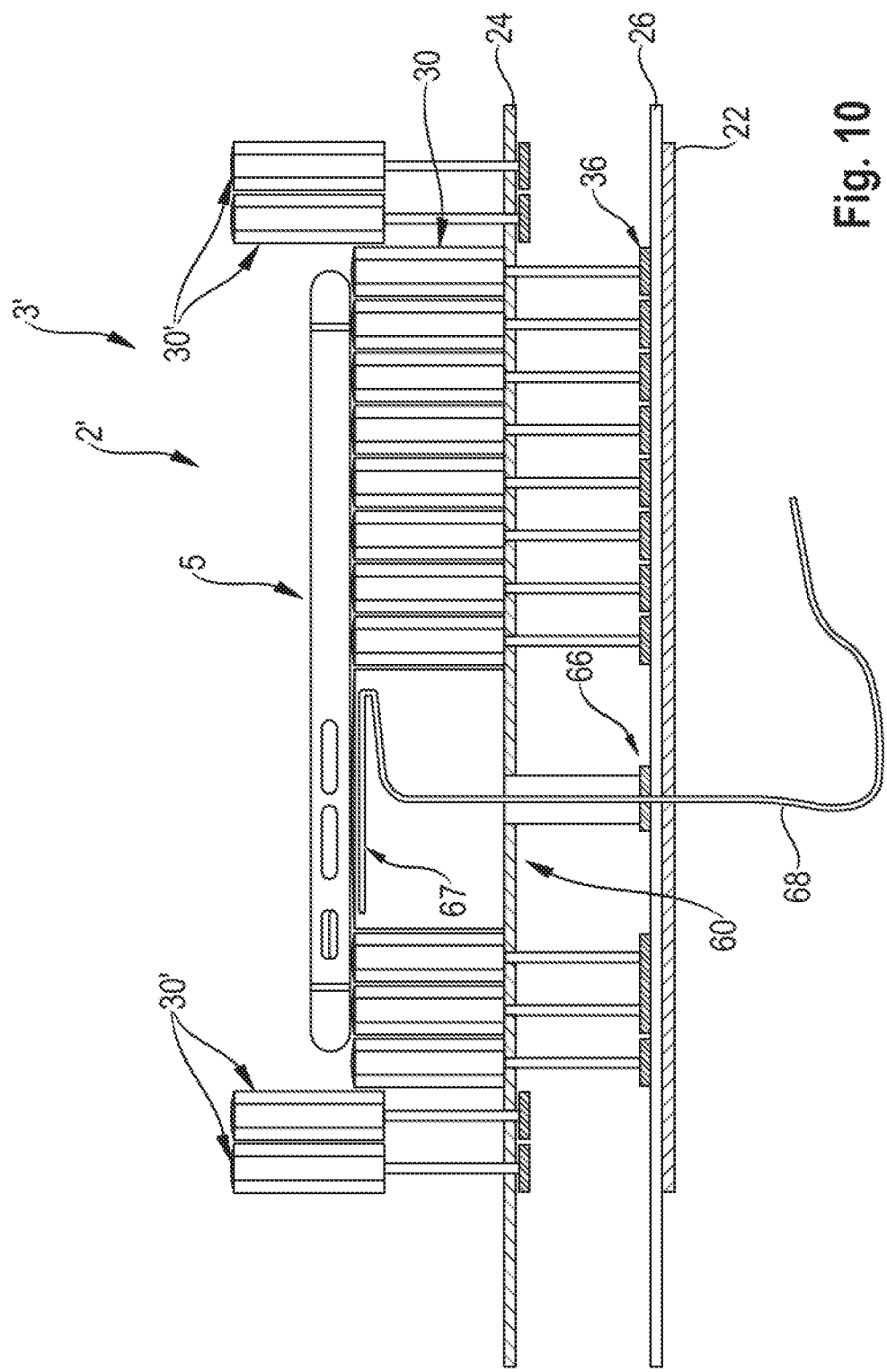
FIG. 10 shows the view of FIG. 9 with the object being fixated in a storage position.

FIG. 10 which resembles FIG. 6 shows how the object 5 is fixated by the pins 30' of the pin matrix 3' wherein the pins 30 and the charging element 60 on which the object 5 is positioned are moved downwards until the magnetic end portions 36 of the related pins 30 and the magnetic end portion 66 of the charging element 60 are in contact with the non-ferrous reset plate 26 where they are held by the magnetic force established between each magnetic end portion 36, 66 and the base plate 22 below the non-ferrous reset plate 26.

It can also be seen in FIG. 10 that the remaining pins 30' which have not been pressed down form a bordering frame around the object 5. If the object 5 is an inductively loadable mobile phone which is placed on the charging element 60 the battery of the mobile phone can be inductively charged by the charging coil 67 of the charging element 60 when the charging coil 67 is connected to a power source via a charging cable 68.

The invention is not limited to the above-described exemplary embodiments, which only serve for a general explanation of the core concept of the invention. Rather more, it is within the scope of protection that the storage bin for a vehicle interior in accordance with the invention could also adopt different forms than those of the embodiment(s) described above. In particular thereby, the device and/or method according to the invention may comprise features which represent a combination of the respective individual features of the claims.

The reference symbols and numbers in the claims, the description and the drawings serve only to provide a better understanding and are not intended to limit the scope of protection.

LIST OF REFERENCE NUMERALS 1 motor vehicle
2 object fixation device
2' object fixation device
3 pin matrix
3' pin matrix
4 storage bin
4' storage bin
4" storage bin
5 object 6 electric charger device
10 dashboard
10' front storage area
11 door storage area
12 steering wheel
13 armrest
14 driver seat
15 passenger seat
16 vehicle door
17 armrest
18 middle console
19 center storage area
20 storage surface
22 base plate
24 guiding plate
25 hole
25' through hole
26 reset plate
30 pin
30' pin
31 upper end surface
32 support section
32' lower end portion
32" circumferential edge
33 side face of cross-section
33' side face of cross-section
33" side face of cross-section
34 guide section
34' lower end of guide section
34" upper end portion of guide section
35 magnetic disc
36 magnetic end portion
60 charging element
61 upper surface of induction head section
61' knobs
62 inductive head section
64 stem
64' lower end of stem
64" upper end of stem
66 magnetic end portion
67 charging coil
68 charging cable
z axial direction
z' longitudinal axis
P pressing force
P' lifting force The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A storage bin for a vehicle interior, comprising:
an adaptable object fixation device comprising:
a guiding plate and a plurality of pins defining a pin matrix;
a base plate; and
a non-ferrous rest plate, wherein
each pin is provided with a guide section and wherein the guiding plate is provided with a plurality of through holes each of which defines a guide hole for receiving the guide section of an associated pin of the plurality of pins,
the pins are individually movably mounted to the guiding plate,
each of the pins is provided with a magnetic end portion at a lower end of the guide section,
the guiding plate is made of or comprises a ferrous material,
the base plate is made of or comprises a ferrous material, and
the non-ferrous reset plate movably is arranged between the guiding plate and the base plate below the magnetic end portions of the pins.

2. The storage bin according to claim 1, wherein
each through hole of the plurality of through holes has a rotation-protection shape, and
the guide section of an associated pin of the plurality of pins has a cross-section adapted to the through hole.

3. The storage bin according to claim 2, wherein
each through hole has a non-circular opening cross-section, and
the associated guide section has a non-circular cross-section adapted to the shape of the opening cross-section.

4. The storage bin according to claim 1, wherein
each pin of the plurality of pins is movable in a first direction being an axial direction of the pin wherein the axial directions of the plurality of pins are aligned in a parallel manner.

5. The storage bin according to claim 4, wherein
the non-ferrous reset plate is movable in the first direction.

6. The storage bin according to claim 1, wherein
each pin of the plurality of pins comprises an upper support section above the upper end portion of the guide section remote from the magnetic end portion.

7. The storage bin according to claim 6, wherein
the cross-section of the upper support section is larger than the cross-section of the guide section.

8. The storage bin according to claim 7, wherein
the cross-section of the upper support section is of hexagonal shape.

9. The storage bin according to claim 8, wherein
outer surfaces of adjacent pins of the pin matrix facing each other define plain bearing surfaces so that the pin matrix defines a substantially gap free storage surface.

10. The storage bin according to claim 6, wherein
the upper end surface of the support section of each pin remote from the guide section is of convex dome shape.

11. The storage bin according to claim 6, wherein
the lower end portion of the support section of each pin adjacent to the guide section is provided with a rounded circumferential edge and/or narrows towards the guide section.

12. The storage bin according to claim 1, wherein
a section of the object fixation device is formed as a movable inductive charging element of an electric charger device.

13. The storage bin according to claim 12, wherein
the charging element comprises an inductive head section mounted to an upper end of at least one stem defining a guide section of the charging element, the stem being equipped at the lower end thereof with a magnetic end portion, wherein the stem is guided by an associated through hole of the guiding plate.

14. The storage bin according to claim 13, wherein
the stem has a non-circular cross-section, and
the associated through hole has a non-circular opening cross-section adapted to the shape of the stem cross-section.

15. An automotive vehicle comprising at least one storage bin according to claim 1.

\* \* \* \* \*